United States Patent
Chen (10) Patent No.: US 10,277,113 B2
(45) Date of Patent: Apr. 30, 2019

(54) SWITCHING POWER SUPPLY WITH OUTPUT POWER ESTIMATION

(71) Applicant: Fuji Electric Co., Ltd., Kanagawa (JP)

(72) Inventor: Jian Chen, Nagano (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 4 days.

(21) Appl. No.: 15/831,803

(22) Filed: Dec. 5, 2017

(65) Prior Publication Data

US 2018/0198364 A1 Jul. 12, 2018

(30) Foreign Application Priority Data

Jan. 11, 2017 (JP) .................. 2017-002458

(51) Int. Cl.
  *H02M 1/32* (2007.01)
  *H02M 1/08* (2006.01)
  *H02M 3/335* (2006.01)
  *H02M 3/337* (2006.01)
  *H02M 1/00* (2006.01)

(52) U.S. Cl.
  CPC .............. *H02M 1/32* (2013.01); *H02M 1/08* (2013.01); *H02M 3/3376* (2013.01); *H02M 3/33569* (2013.01); *H02M 2001/0058* (2013.01); *Y02B 70/1433* (2013.01); *Y02B 70/1491* (2013.01)

(58) Field of Classification Search
  CPC ........... H02M 2007/4815; H02M 3/28; H02M 3/33523; H02M 3/33569; H02M 1/32; H02M 1/08
  See application file for complete search history.

(56) References Cited

U.S. PATENT DOCUMENTS

| 5,910,709 A * | 6/1999 | Stevanovic ........ H05B 41/2851 |
| | | 315/119 |
| 2013/0343096 A1* | 12/2013 | Stuler ..................... H02M 1/32 |
| | | 363/21.02 |
| 2017/0077798 A1* | 3/2017 | Drda ....................... H02M 1/32 |
| 2017/0155316 A1* | 6/2017 | Fawaz ..................... H02M 1/36 |

FOREIGN PATENT DOCUMENTS

JP H8-163866 A 6/1996

* cited by examiner

*Primary Examiner* — Jue Zhang
*Assistant Examiner* — Lakaisha Jackson
(74) *Attorney, Agent, or Firm* — Chen Yoshimura LLP (57) ABSTRACT

A switching power supply device includes a control unit alternately turning a first switching device and a second switching device ON/OFF so as to drive a primary side of a transformer, wherein the control unit includes: a peak power limiting circuit that monitors input power to the primary side of the transformer and outputs a forced turn OFF signal every time the input power becomes higher than a prescribed value; and a switching cycle counter circuit that estimates an output voltage on a secondary side of the transformer by counting a number of times the forced turn OFF signal is outputted by the peak power limiting circuit, and outputs a switching stop signal that causes the alternating turning ON/OFF of the first and second switching devices to stop when the estimated output voltage reaches an overvoltage protection detection voltage.

18 Claims, 10 Drawing Sheets

SWITCHING POWER SUPPLY WITH OUTPUT POWER ESTIMATION

BACKGROUND OF THE INVENTION

Technical Field

The present invention relates to a switching power supply device, and particularly relates to a switching power supply device that is a current resonant DC-DC converter.

Background Art

Current resonant DC-DC converter switching power supply devices can be made highly efficient and thin, and are therefore widely employed in liquid-crystal televisions, AC-DC adapters, and so on. A current resonant DC-DC converter switching power supply device generally includes a half-bridge circuit in which two switching devices are connected in series, a resonant capacitor, a transformer, an output rectifying diode, and an output capacitor. The transformer used in the switching power supply device is often used as a resonant inductor by increasing the leakage inductance component through decreasing the coupling coefficient.

The switching devices constituting the half-bridge circuit are connected to a control unit and are alternately turned ON/OFF by signals output from a high-side drive circuit and low-side drive circuit in the control unit. Turning the switching devices ON/OFF controls the resonant current of the resonant circuit, and the resonant current is transmitted to the secondary side of the transformer and then converted into a direct-current output voltage by being rectified and smoothed. The output voltage is compared to a target voltage via a shunt regulator, and a differential signal of the difference between the output voltage and the target voltage is returned to the control unit via a photocoupler. The control unit varies the switching frequency of the switching devices based on the returned differential signal so that the output voltage will match the target voltage (see Patent Document 1, for example).

The control unit disclosed in Patent Document 1 increases the output voltage when the output voltage falls below the target voltage and decreases the output voltage when the output voltage rises above the target voltage. In such a case, if the photocoupler were to malfunction or if the return circuit were to become open, the control unit would determine that the output voltage had dropped and would thus increase the output voltage. On the other hand, if the control unit detects that the return circuit is open and operates a charging circuit made of a resistor and capacitor, then when the voltage charged in the capacitor exceeds a reference potential, the control unit would stop ON/OFF control of the switching devices to set the output voltage to 0.

In regard to the control unit in Patent Document 1, the time from when the open state of the return circuit is detected to the output voltage being set to 0 is determined by a time constant of the resistor and the capacitor. During this time, it is not possible to control stabilization of the output voltage, and thus it is not clear how the output voltage is actually changing. Due to this, it is possible that the output voltage could rise to abnormally high levels.

As a countermeasure, recent switching power supply devices include an over-voltage detection circuit that detects an overvoltage of the output voltage, and when the over-voltage detection circuit has detected an overvoltage, the signal is returned to the control unit via a photocoupler and the control unit then stops ON/OFF control of the switching devices. Due to this, overvoltage protection control for output voltage is performed alongside stabilization control of the output voltage; therefore, if an overvoltage of the output voltage occurs, it is possible to reliably stop ON/OFF control of the switching devices.

RELATED ART DOCUMENT

Patent Document

Patent Document 1: Japanese Patent Application Laid-Open Publication No. H8-163866

SUMMARY OF THE INVENTION

However, overvoltage protection control requires an overvoltage detection circuit and a photocoupler as external components, and thus not only does the cost of the switching power supply device become greater, but it becomes difficult to make the switching power supply device more compact and lightweight.

The present invention was made in view of the above issues and aims at providing a switching power supply device that eliminates the need for external components by conferring an overvoltage protection function to a control unit for controlling switching devices.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a switching power supply device, including: a transformer having a primary side and a secondary side; a first series circuit to which a direct-current input voltage is applied to respective terminals thereof, the first series circuit connecting a first switching device on a high side and a second switching device on a low side in series, a node between the first and second switching devices being connected to the primary side of the transformer; a second series circuit connecting a resonant inductor and a resonant capacitor in series, the second series circuit being connected in parallel to the first switching device or the second switching device; and a control unit alternately turning the first switching device and the second switching device ON/OFF so as to drive the primary side of the transformer, wherein the control unit includes: a peak power limiting circuit that monitors input power to the primary side of the transformer and outputs a forced turn OFF signal every time the input power becomes higher than a prescribed value; and a switching cycle counter circuit that estimates an output voltage on the secondary side of the transformer by counting a number of times the forced turn OFF signal is outputted by the peak power limiting circuit, and outputs a switching stop signal that causes the alternating turning ON/OFF of the first and second switching devices to stop when the estimated output voltage reaches an overvoltage protection detection voltage.

In the switching power supply device described above, the control unit is configured to estimate an output voltage at the secondary side of a transformer based on energy transmitted to the secondary side during switching of switching devices; therefore, this is advantageous in that external components for overvoltage protection control are unnecessary. External components being unnecessary makes it possible for the switching power supply device to be lower in cost, more compact in size, and lighter in weight.

It is to be understood that both the foregoing general description and the following detailed description are exemplary and explanatory, and are intended to provide further explanation of the invention as claimed.

DETAILED DESCRIPTION OF EMBODIMENTS

Below, embodiments of the present invention will be explained in detail with reference to the drawings. The respective embodiments can be combined with parts from other embodiments without contradiction. In the explanations below, terminal names and the voltage, signal, etc. at the terminal may be given the same reference character.

Embodiment 1

Figure 1:
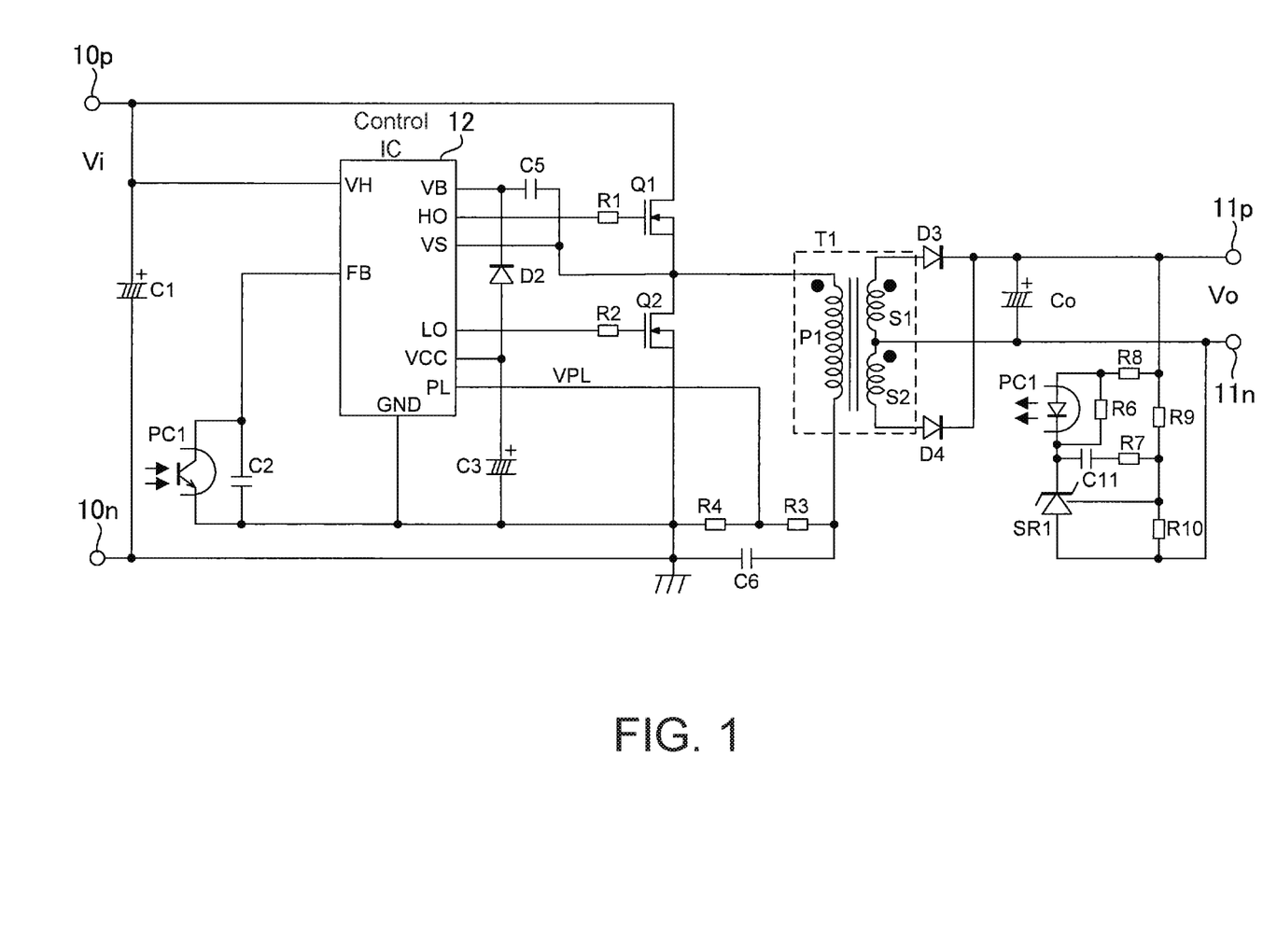
FIG. 1 is a circuit diagram showing a configuration example of a switching power supply device provided with a current resonant DC-DC converter according to Embodiment 1.
Figure 2:
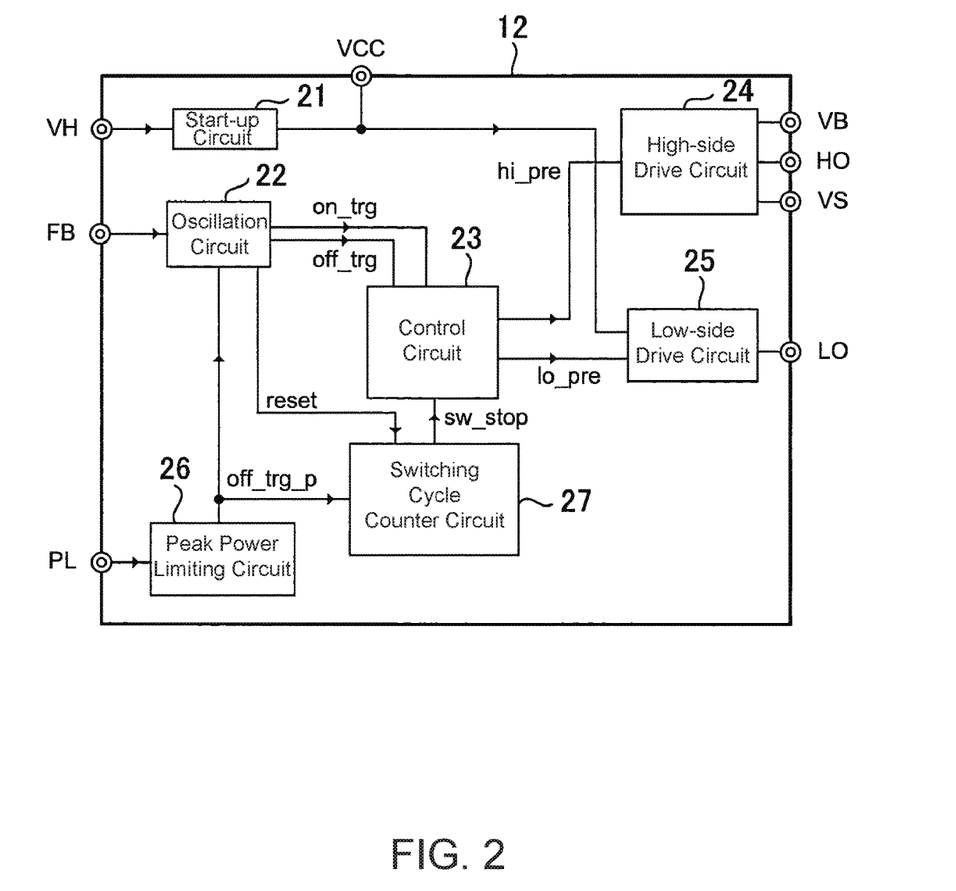
FIG. 2 is a diagram showing a configuration example of a control IC.
Figure 3:
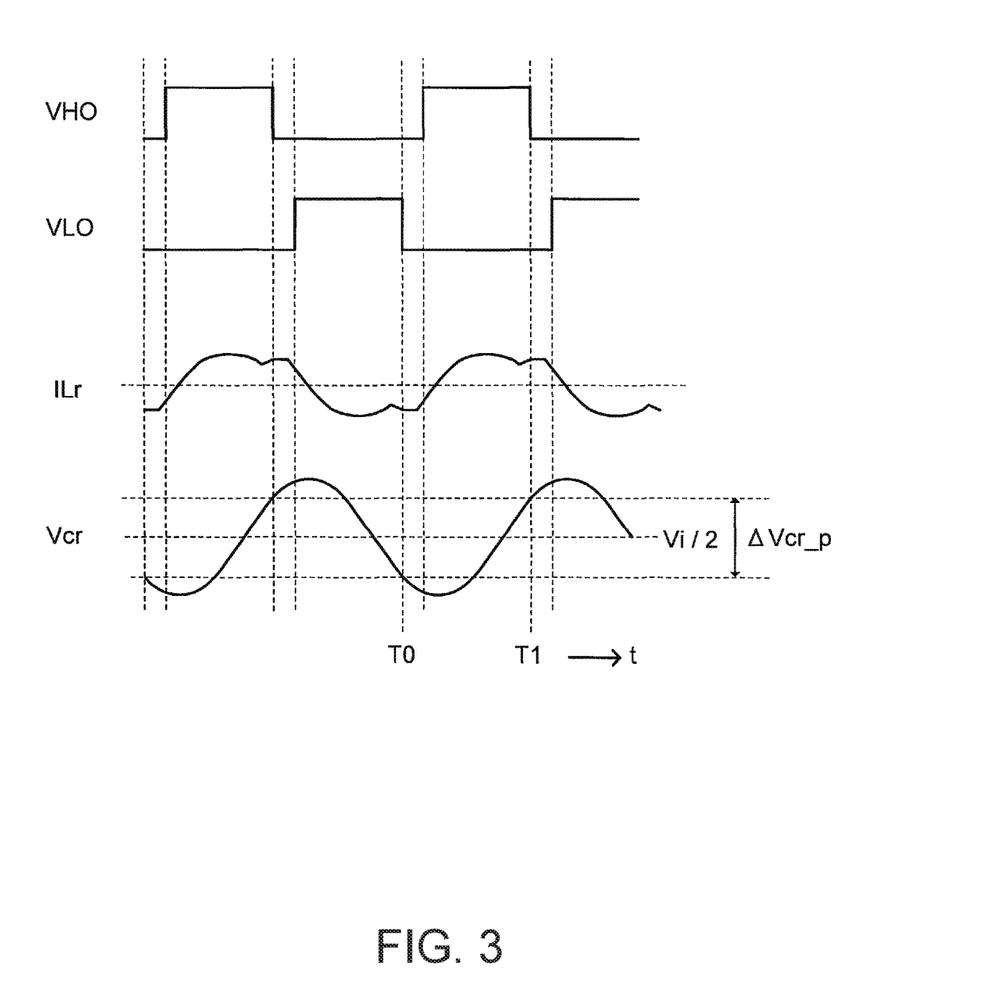
FIG. 3 is a drawing showing an operation sequence of the current resonant switching power supply device.

FIG. 1 is a circuit diagram showing a configuration example of a switching power supply device provided with a current resonant DC-DC converter according to Embodiment 1, FIG. 2 is a diagram showing a configuration example of a control IC, and FIG. 3 is a drawing showing an operation sequence of the current resonant switching power supply device.

The switching power supply device of Embodiment 1 has two input terminals 10p and 10n to which an input capacitor C1 is connected, and receives a direct-current input voltage Vi that has been made uniform via a high voltage generated by a power factor improvement circuit, for example. The input terminals 10p and 10n have connected thereto a series circuit of a high-side switching device Q1 and low-side switching device Q2 and form a half-bridge circuit. In the example shown in the drawings, N-channel MOSFETs (metal oxide semiconductor field effect transmitters) are used as the switching devices Q1 and Q2.

The node shared by the switching devices Q1 and Q2 is connected to one terminal of a primary coil P1 of a transformer T1, and the other terminal of the primary coil P1 is connected to ground via a resonant capacitor C6. In this example, the leakage inductance component between the primary coil P1 and secondary coils S1, S2 of the transformer T1 and the resonant capacitor C6 form a resonant circuit. Alternatively, instead of using the leakage inductance, another inductance that is different from the inductance forming the transformer T1 may be connected in series to the resonant capacitor 6, and may be used as a resonant reactance of the resonant circuit.

One terminal of the secondary coil S1 of the transformer T1 is connected to the anode terminal of a diode D3, and one terminal of the secondary coil S2 is connected to the anode terminal of a diode D4. The cathode terminals of the diodes D3 and D4 are both connected to the positive electrode terminal of an output capacitor Co and an output terminal 11p. The negative electrode terminal of the output capacitor Co is connected to a node shared by the secondary coils S1, S2 and an output terminal 11n. The secondary coils S, S2, diodes D3, D4, and output capacitor Co form a circuit that rectifies and smooths an alternating-current voltage induced in the secondary coils S1 and S2 in order to convert the alternating-current voltage into a direct-current output voltage Vo; in other words, the aforementioned secondary coils, diodes, and output capacitor form an output circuit of the switching power supply device.

The positive electrode terminal of the output capacitor Co is connected to the anode terminal of a light-emitting diode of a photocoupler PC1 via a resistor R8, and the cathode terminal of the light-emitting diode is connected to the cathode terminal of a shunt regulator SR1. A resistor R6 is connected between the anode terminal and the cathode terminal of the light-emitting diode. The anode terminal of the shunt regulator SR1 is connected to the output terminal 11n. The shunt regulator SR1 has a reference terminal connected to a node of resistors R9 and R10, which are connected in series between the positive electrode terminal and negative electrode terminal of the output capacitor Co. A series circuit of a resistor R7 and capacitor C11 is connected between the reference terminal and cathode terminal of the shunt regulator SR1. The shunt regulator SR1 causes to flow to the light-emitting diode of the photocoupler PC1 a current based on the difference between an internal reference voltage and a potential that is the divided output voltage Vo (the voltage across both terminals of the output capacitor Co). This causes a current that corresponds to the difference between the output voltage Vo and the target voltage to flow to the light-emitting diode. In regard to the phototransistor of the photocoupler PC1, the collector terminal is connected to the FB terminal of a control IC (integrated circuit) 12, the emitter terminal is connected to ground, and a capacitor C2 is connected between the collector terminal and the emitter terminal.

The control IC 12 is a control unit that controls the switching power supply device and has a VH terminal connected to the positive electrode terminal of the input capacitor C1 and a GND terminal connected to ground. The control IC 12 further includes an HO terminal connected to the gate terminal of the switching device Q1 via the resistor R1, an LO terminal connected to the gate terminal of the switching device Q2 via the resistor R2, and also a VB terminal, VS terminal, VCC terminal, and PL terminal. A capacitor C5 is connected between the VB terminal and VS terminal, and the VS terminal is connected to a node shared by the switching devices Q1 and Q2. The VCC terminal is connected to the positive electrode terminal of a capacitor C3, and the negative electrode terminal of the capacitor C3 is connected to ground. The VCC terminal is further connected to the anode terminal of the diode D2, and the cathode terminal of the diode D2 is connected to the VB terminal. Although not shown in the drawings for simplicity's sake, the VCC terminal is connected to an auxiliary coil of the transformer T1 via a diode, and after the switching power supply device has started up, the current induced in the auxiliary coil is stored in a capacitor C3 and serves as the power supply of the control IC 12. The PL terminal is connected to a node shared by serially-connected resistors R3 and R4, and the serially-connected resistors R3 and R4 are connected in parallel to the resonant capacitor C6. Due to this, a voltage that is the divided terminal voltage (voltage across both terminals) of the resonant capacitor C6 is supplied to the PL terminal as a signal expressing power (input power).

As shown in FIG. 2, the control IC 12 has a start-up circuit 21 in which the input terminal is connected to the VH terminal, and the output terminal of the start-up circuit 21 is connected to the VCC terminal. The FB terminal is connected to the input terminal of an oscillation circuit 22, and the output terminal of the oscillation circuit 22 connects to a control circuit 23 and supplies an ON trigger signal on_trg and OFF trigger signal off_trg to the control circuit 23. The FB terminal is pulled up to a reference voltage (not shown) via a resistor (not shown). The high-side output terminal of the control circuit 23 connects to the input terminal of a high-side drive circuit 24 and supplies a high-side drive signal hi_pre. The low-side output terminal of the control circuit 23 connects to the input terminal of a low-side drive circuit 25 and supplies a low-side drive signal lo_pre. The output terminal of the high-side drive circuit 24 is connected to the HO terminal, and the output terminal of the low-side drive circuit 25 is connected to the LO terminal. The high-side drive circuit 24 is connected to the VB terminal used as the power supply of the high side, and the VS terminal, which serves as the reference potential of the high side.

The PL terminal is connected to the input terminal of a peak power limiting circuit 26, and the output terminal of the peak power limiting circuit 26 is connected to the input terminal of the oscillation circuit 22 and the input terminal of a switching cycle counter circuit 27. The peak power limiting circuit 26 outputs a forced turn OFF signal off_trg_p during an abnormal state in which it is no longer possible to stabilize the output voltage via the feedback circuit due to malfunction of the photocoupler PC1 or the like. When the oscillation circuit 22 receives the forced turn OFF signal off_trg_p, the oscillation circuit 22 outputs an OFF trigger signal off_trg so as to limit peak power. The output terminal of the switching cycle counter circuit 27 is connected to the control circuit 23, and when the number of times that the forced turn OFF signal off_trg_p has been received reaches a prescribed number, the output terminal of the switching cycle counter circuit outputs a switching stop signal sw_stop. The control circuit 23 causes the switching operation to stop when the control circuit receives the switching stop signal sw_stop.

In the control IC 12, the peak power limiting circuit 26 monitors the voltage that is the divided terminal voltage (voltage between both terminals) of the resonant capacitor C6 and that represents input energy, and when control of the output voltage becomes abnormal, the peak power limiting circuit outputs the forced turn OFF signal off_trg_p. When the oscillation circuit 22 receives the forced turn OFF signal off_trg_p, the oscillation circuit suppresses power by making earlier the timing at which the OFF trigger signal off_trg is output. The switching cycle counter circuit 27 counts the number of times that the forced turn OFF signal off_trg_p has been received to estimate the output voltage, and when the estimated output voltage has reached the overvoltage protection detection voltage, the switching cycle counter circuit outputs the switching stop signal sw_stop to the control circuit 23.

The following is an explanation of the mechanism that allows the peak power limiting circuit 26 and switching cycle counter circuit 27 to estimate the output voltage. First, when control of the output voltage becomes abnormal, and the input energy becomes excessively large, and thus the voltage signal that is the divided terminal voltage (voltage across both terminals) of the resonant capacitor C6 becomes high, the peak power limiting circuit 26 outputs the forced turn OFF signal off_trg_p each time the voltage signal exceeds a prescribed threshold. The forced turn OFF signal off_trg_p controls ON/OFF of the switching devices Q1, Q2 to limit the energy being transmitted to the secondary side of the transformer T1. At such time, if the amount of energy that can be transmitted in one round of switching (one round of operation each of the high side and low side) is known, then it is possible to calculate the secondary side output voltage induced by the energy. Here, the energy is considered to be the energy injected into the switching power supply device from the input voltage Vi via the body diode of the switching device Q1 and the switching device Q1 from the time the switching device Q2 turns OFF. Letting Ii be the current flowing to the switching device Q1 when the switching device Q1 is ON, the energy Wp_p that can be transmitted (input) in one round of switching is:

[Eq. 1]

$$W_{p\_p} = \int_{T0}^{T1} (Vi * Ii) dt \quad (1)$$
$$= Vi \int_{T0}^{T1} Ii * dt$$
$$= Vi * (Q(t=T1) - Q(t=T0))$$
$$= Vi * Cr * \left( \frac{Vi + \Delta V_{cr\_p}}{2} - \frac{Vi - \Delta V_{cr\_p}}{2} \right)$$
$$= Vi * Cr * \Delta V_{cr\_p}$$

In the equation, T0 is when the switching device Q2 turns OFF, or namely when the terminal voltage (voltage across both terminals) of the resonant capacitor C6 is (Vi/2−ΔVcr_p/2), and T1 is when the switching device Q1 turns OFF, or namely when the terminal voltage of the resonant capacitor C6 is (Vi/2+ΔVcr_p/2). Q(t=T0) is the magnitude of the electrical charge stored in the resonant capacitor C6 at T0, and Q(t=T1) is the magnitude of the electrical charge stored in the resonant capacitor C6 at T1. ΔVcr_p is the differential in voltage of the resonant capacitor C6 during peak power limiting. In other words, as shown in FIG. 3, ΔVcr_p is the differential between the voltage of the resonant capacitor C6 when the low-side signal VLO turns OFF (e.g., T0) and the voltage of the resonant capacitor C6 when the high-side signal VHO turns OFF (e.g., T1). FIG. 3 shows, from the top, the signal VHO output to the HO terminal by the high-side drive circuit 24, the signal VLO output to the LO terminal by the low-side drive circuit 25, the current ILr that has flowed to the primary coil P1 of the transformer T1, and the voltage Vcr across the terminals of the resonant capacitor C6.

In a state in which the output voltage can no longer be controlled due to abnormality of the feedback circuit, the overshoot of the output voltage is greatest when there is no load. Due to this, the detection voltage for the overvoltage protection function of the output voltage is set to a voltage that rises when there is no load, in consideration of this type of worst case scenario. Thus, letting Vo_ovp be the OVP (overvoltage protection) voltage, which is the detection voltage for the overvoltage protection function, the energy Ws_ovp from when a secondary-side output voltage during no load rises from a voltage Vo during normal operation to the OVP voltage Vo-ovp is:

$$Ws\_ovp=(\tfrac{1}{2})\times Co\times(Vo\_ovp\char`^2 - Vo\char`^2) \qquad (2)$$

In the equation, Co is the capacitance of the secondary-side output capacitor Co.

In this manner, it is possible to know the energy Ws_ovp needed for the voltage of the output capacitor Co to rise to the OVP voltage Vo_ovp; thus, next is the consideration of how many rounds of switching are needed to obtain the energy Ws_ovp. The energy Wp_p transmitted in one round of switching is found by equation (1), and since equation (1) is unrelated to the output voltage, it can be applied in the same manner not only when the output voltage is in a normal state, but also when the output voltage is in an overvoltage state. Accordingly, Nsw_ovp, which is the required number of switching for voltage Vo to reach OVP voltage Vo_ovp, is:

$$Nsw\_ovp=Ws\_ovp/Wp\_p \qquad (3)$$

Based on equation (3), by the switching cycle counter circuit 27 counting the forced turn OFF signals off_trg_p up to the switching number Nsw_ovp, it is possible to estimate that the output voltage has risen to the OVP voltage Vo_ovp.

For example, when Co=1000 μF, Cr=33 nF, Vo=48V, Vo_ovp=60V, Vi=400V, and ΔVcr_p=300V, then Nsw_ovp≈164. In such a case, the power P input from Vi to the switching power supply device, at switching frequency fsw=100 kHz, is:

$$P=Wp\_p\times fsw \qquad (4)$$

Thus, P=396 W.

The switching cycle counter circuit 27 counts the number of switching cycles for peak power, or in other words, counts the number of times that the forced turn OFF signal off_trg_p has been input, and when the number becomes twice that of the switching cycles Nsw_ovp, the switching stop signal sw_stop is output (the forced turn OFF signal off_trg_p is output twice in one switching period, namely when the high-side switching device Q1 is turned OFF and when the low-side switching device Q2 is turned OFF). The control circuit 23 causes the switching operation to stop when the control circuit receives the switching stop signal sw_stop.

Next is an explanation of a specific configuration example of the oscillation circuit 22, peak power limiting circuit 26, and switching cycle counter circuit 27 in the control IC 12, which estimates the secondary-side output voltage and causes switching operation to be stopped when the OVP voltage Vo_ovp is reached.

Figure 4:
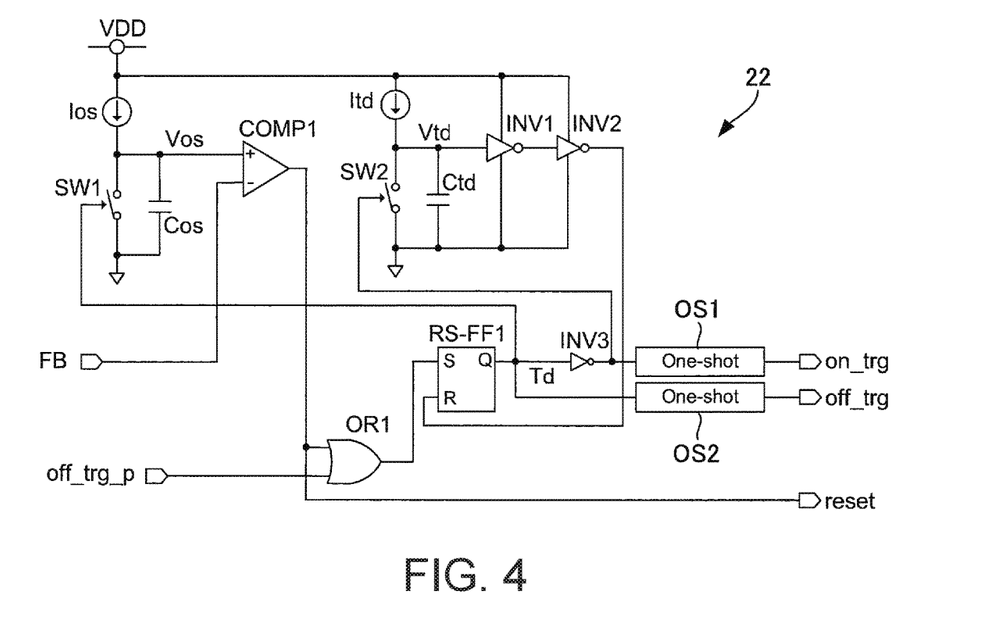
FIG. 4 is a circuit diagram showing a configuration example of an oscillation circuit.
Figure 5:
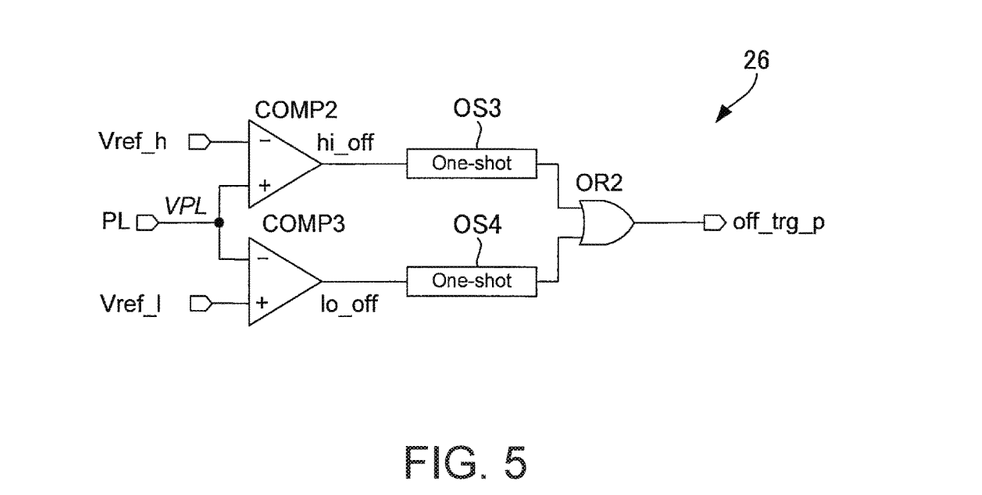
FIG. 5 is a circuit diagram showing a configuration example of a peak power limiting circuit.
Figure 6:
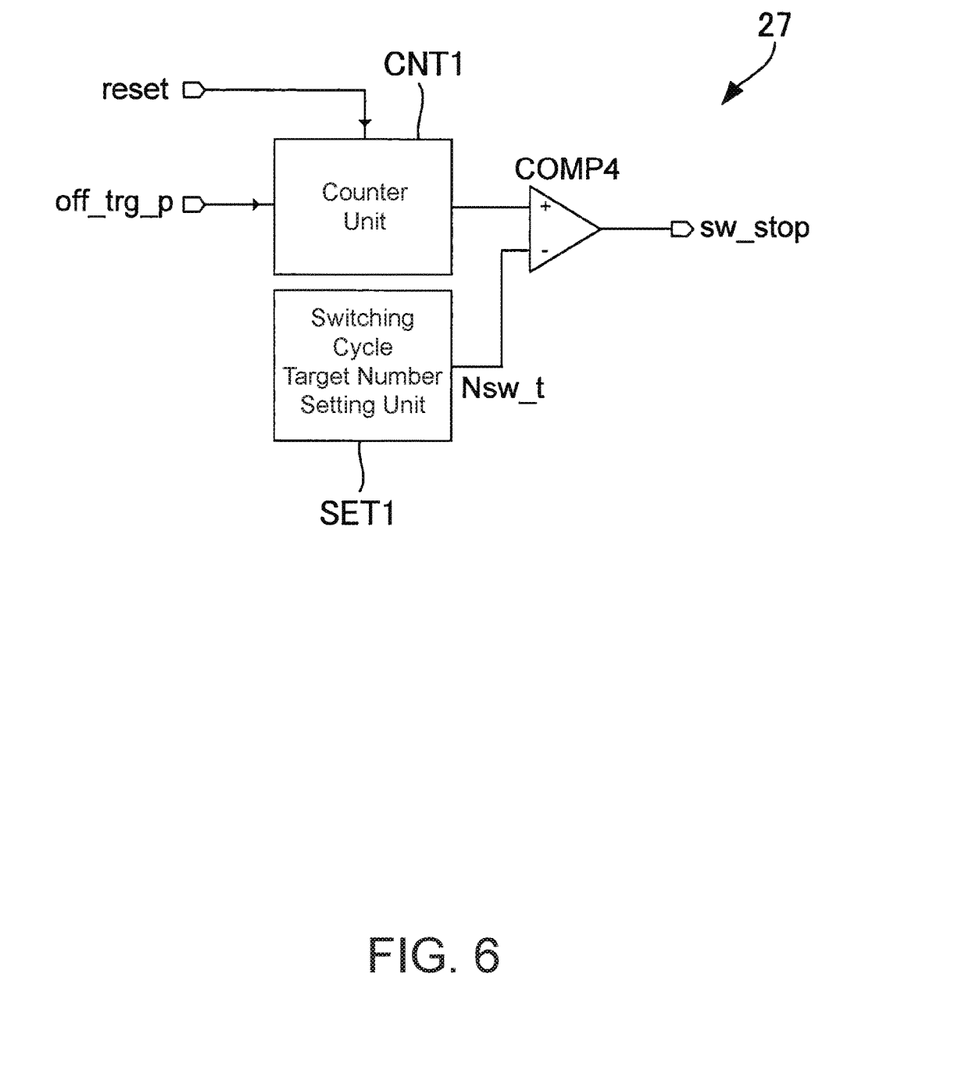
FIG. 6 is a circuit diagram showing a configuration example of a switching cycle counter circuit.
Figure 7:
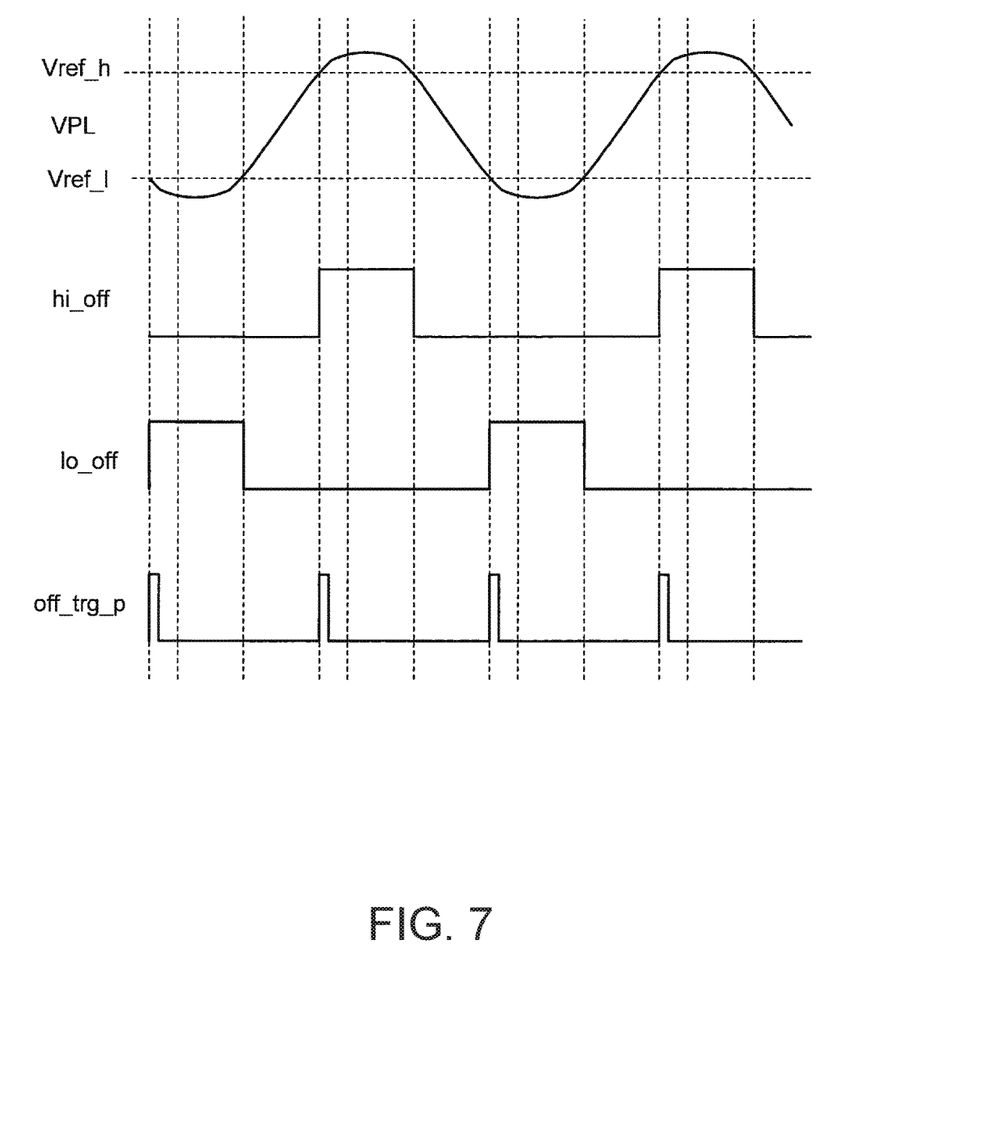
FIG. 7 is a drawing showing an operation sequence of the peak power limiting circuit during peak power limiting.
Figure 8:
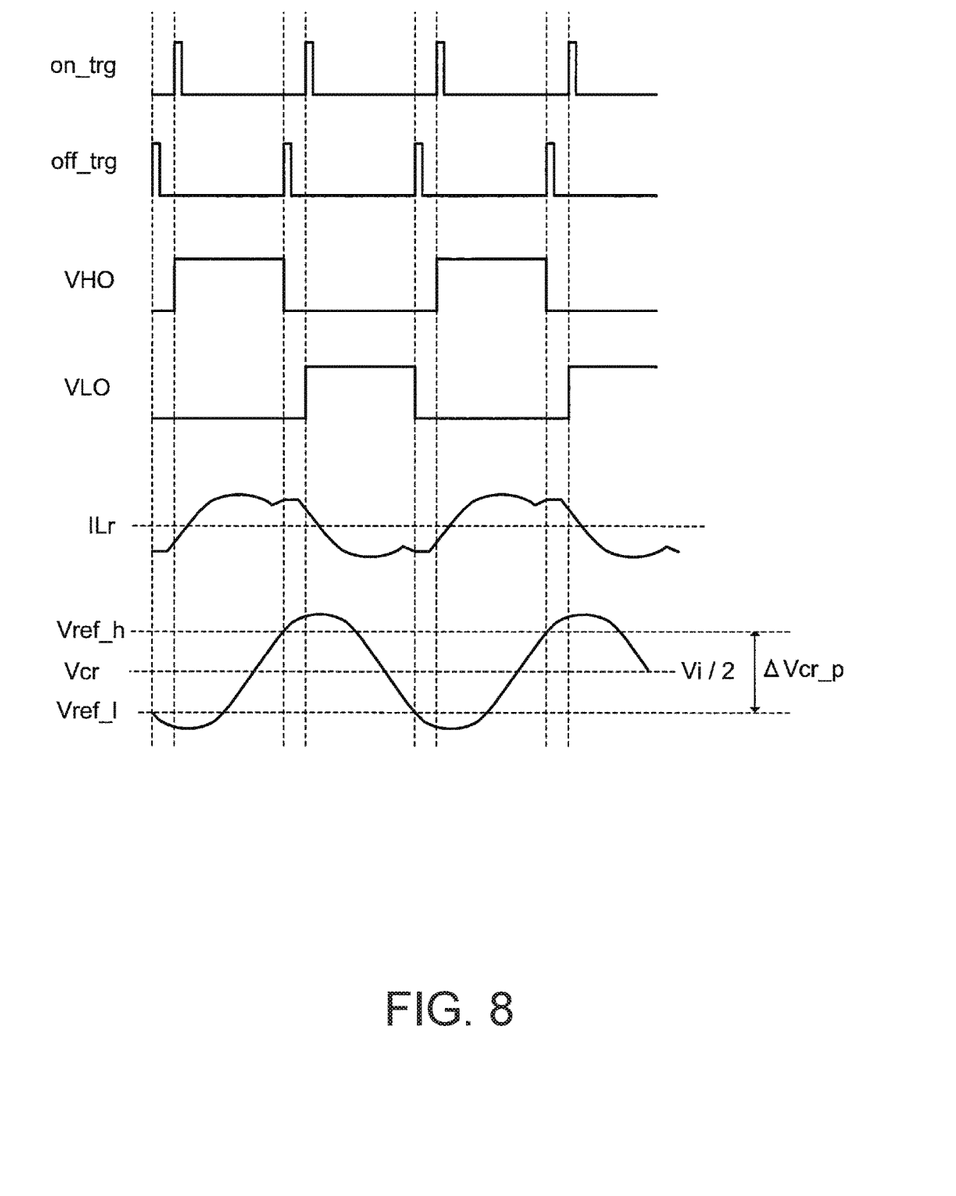
FIG. 8 is a drawing showing an operation sequence of the current resonant switching power supply device during peak power limiting.

FIG. 4 is a circuit diagram showing a configuration example of the oscillation circuit, FIG. 5 is a circuit diagram showing a configuration example of the peak power limiting circuit, and FIG. 6 is a circuit diagram showing a configuration example of the switching cycle counter circuit. FIG. 7 is a drawing showing an operation sequence of the peak power limiting circuit during peak power limiting, and FIG. 8 is a drawing showing an operation sequence of the current resonant switching power supply device during peak power limiting.

As shown in FIG. 4, in the oscillation circuit 22, the FB terminal is connected to the inverting input terminal of a comparator COMP1. The non-inverting input terminal of the comparator COMP1 is connected to a node between one terminal of a constant current source Ios and one terminal of a capacitor Cos. The non-inverting input terminal of the comparator COMP1 receives a charging voltage Vos of the capacitor Cos. The other terminal of the constant current source Ios is connected to a power supply VDD, and the other terminal of the capacitor Cos is connected to ground. A switch SW1 is connected in parallel to the capacitor Cos. In this example, the comparator COMP1, constant current source Ios, capacitor Cos, and switch SW1 form an OFF trigger signal generating circuit.

The output terminal of the comparator COMP1 is connected to a first input terminal of an OR circuit OR1. A second input terminal of the OR circuit OR1 is connected to a terminal that receives the forced turn OFF signal off_trg_p from the peak power limiting circuit 26. The output terminal of the OR circuit OR1 is connected to a set input terminal S of an RS flip-flop RS-FF1. The output terminal of the comparator COMP1 is also connected to a terminal that outputs a reset signal reset to the switching cycle counter circuit 27.

An output terminal Q of the RS flip-flop RS-FF1 is connected to a control input terminal of the switch SW1, an input terminal of an inverter circuit INV3, and an input terminal of a one-shot circuit OS2. The output terminal Q of the RS flip-flop RS-FF1 outputs a signal Td that is input to the respective circuits. The output terminal of the inverter circuit INV3 is connected to an input terminal of a one-shot circuit OS1. The output terminal of the one-shot circuit OS1 forms a terminal for outputting an ON trigger signal on_trg of the oscillation circuit 22. The output terminal of a one-shot circuit OS2 forms a terminal for outputting an OFF trigger signal off_trg of the oscillation circuit 22.

The output terminal of the inverter circuit INV3 is also connected to a control input terminal of a switch SW2. One terminal of the switch SW2 is connected to one terminal of a constant current source Itd, one terminal of a capacitor Ctd, and an input terminal of an inverter circuit INV1. The inverter circuit INV1 receives a charging voltage Vtd of the capacitor Ctd. The other terminal of the constant current source Itd is connected to the power supply VDD, and the other terminal of the capacitor Ctd and the other terminal of the switch SW2 are connected to ground. The output terminal of the inverter circuit INV1 is connected to the input terminal of the inverter circuit INV2, and the output terminal of the inverter circuit INV2 is connected to a reset input terminal R of the RS flip-flop RS-FF1. In this example, the constant current source Itd, switch SW2, capacitor Ctd, and inverter circuits INV1, INV2 form an ON trigger signal generating circuit.

In the oscillation circuit 22, during normal operation, the comparator COMP1 sets the RS flip-flop RS-FF1 via the OR circuit OR1 when the charging voltage Vos of the capacitor Cos becomes greater than the voltage at the FB terminal. The setting of the RS flip-flop RS-FF1 causes a high level (H) signal Td to be output from the RS flip-flop RS-FF1. The signal Td is input to the one-shot circuit OS2, and the one-shot circuit OS2 outputs an OFF trigger off_trg that has a prescribed ON width rising in synchronization with the rising edge of the signal Td. At this time, the H level signal Td turns the switch SW1 ON (causes the switch to be conductive), and thus the charge in the capacitor Cos is discharged. The output of the inverter circuit INV3 then becomes low (L) level and the switch SW2 turns OFF (shut offs), and thus a delay circuit containing the inverter circuits INV1 and INV2 begins delay operation. In this delay circuit, if the charging voltage Vtd of the capacitor Ctd becomes higher than a threshold voltage of the inverter circuit INV1, the RS flip-flop RS-FF1 is reset, and the signal Td becomes L level. The signal Td is logically inverted by the inverter circuit INV3 and input to the one-shot circuit OS1, and the one-shot circuit OS1 outputs an ON trigger signal on_trg that has a prescribed ON width rising in synchronization with the falling edge of the signal Td.

On the other hand, in an abnormal state in which normal control of the output voltage is no longer possible, the forced turn OFF signal off_trg_p is input from the peak power limiting circuit 26. This sets the RS flip-flop RS-FF1, and an H level signal Td is output to the output terminal Q of the RS flip-flop RS-FF1. Due to this, the switch SW2 turns OFF (shuts off) and charging of the capacitor Ctd begins, which causes the charging voltage Vtd to begin rising, and then the one-shot circuit OS2 outputs the OFF trigger signal off_trg. At this time, the switch SW1 turns ON (becomes conductive) and causes the charge in the capacitor Cos to be discharged.

When the charging voltage Vtd exceeds a threshold voltage of the inverter circuit INV1, the RS flip-flop RS-FF1 is reset, and an L level signal Td is output to the output terminal Q of the RS flip-flop RS-FF1. Due to this, the one-shot circuit OS1 outputs an ON trigger signal on_trg.

When the one-shot circuit OS1 outputs the ON trigger signal on_trg, the switch SW1 turns OFF (shuts off) and charging of the capacitor Cos begins. However, before the charging voltage Vos of the capacitor Cos exceeds the value of the FB terminal, the forced turn OFF signal off_trg_p is input, and the switch SW1 then turns ON (becomes conductive); thus, the comparator COMP1 does not output the signal that would be the trigger for generation of the OFF trigger signal off_trg. In this manner, in an abnormal state, the OFF trigger signal off_trg is output at a faster timing than during normal operation, and thus the control circuit 23 suppresses peak power.

As shown in FIG. 5, the peak power limiting circuit 26 has two comparators COMP2 and COMP3. The inverting input terminal of the comparator COMP2 is connected to a terminal that receives a threshold voltage Vref_h generated inside the control IC 12, and the non-inverting input terminal of the comparator COMP3 is connected to a terminal that receives a threshold voltage Vref_l generated inside the control IC 12. The non-inverting input terminal of the comparator COMP2 and the inverting input terminal of the comparator COMP3 connect to the PL terminal of the control IC 12 and receive a voltage VPL, which is the voltage across both terminals of the resonant capacitor C6 divided by the resistors R3 and R4. The output terminal of the comparator COMP2 is connected to one input terminal of the OR circuit OR2 via the one-shot circuit OS3, and the output terminal of the comparator COMP3 is connected to the other input terminal of the OR circuit OR2 via the one-shot circuit OS4. The output terminal of the OR circuit OR2 is connected to a terminal that supplies the forced turn OFF signal off_trg_p to the oscillation circuit 22 and switching cycle counter circuit 27.

The threshold voltages Vref_h and Vref_l of the peak power limiting circuit 26 are determined by the equations below. ΔVcr is the maximum allowable value of the voltage Vcr_p of the resonant capacitor C6, and R3 and R4 are values of the resistors connected in parallel to the resonant capacitor C6.

$$Vref\_h = (Vi/2 + \Delta Vcr\_p/2) \times R4/(R3+R4) \tag{5}$$

$$Vref\_l = (Vi/2 - \Delta Vcr\_p/2) \times R4/(R3+R4) \tag{6}$$

As shown in FIG. 7, in the peak power limiting circuit 26, the comparator COMP2 outputs an H level signal hi_off in a period during which the voltage VPL input to the PL terminal becomes higher than the threshold voltage Vref_h. This causes the one-shot circuit OS3 to output a signal having a prescribed ON width, which is output from the OR circuit OR2 as the forced turn OFF signal off_trg_p. Moreover, the comparator COMP3 outputs an H level signal lo_off in a period during which the voltage VPL input to the PL terminal is lower than the threshold voltage Vref_l. This causes the one-shot circuit OS4 to output a signal having a prescribed ON width, which is output from the OR circuit OR2 as the forced turn OFF signal off_trg_p. Accordingly, the peak power limiting circuit 26 outputs a forced turn OFF signal off_trg_p having a prescribed ON width that rises in synchronization with the rising edges of the signals hi_off and lo_off.

As shown in FIG. 6, the switching cycle counter circuit 27 includes a counter unit CNT1, a switching cycle target number setting unit SET1, and a digital comparator COMP4. The counter unit CNT1 has an input terminal connected to a terminal that receives the forced turn OFF signal off_trg_p from the peak power limiting circuit 26 and a terminal that receives the reset signal reset from the oscillation circuit 22. The output terminal of the counter unit CNT1 is connected to the non-inverting input terminal of the digital comparator COMP4. The output terminal of the switching cycle target number setting unit SET1 is connected to the inverting input terminal of the digital comparator COMP4. The output terminal of the digital comparator COMP4 is connected to the terminal that outputs the switching stop signal sw_stop to the control circuit 23.

This causes the counter unit CNT1 to receive the reset signal reset from the oscillation circuit 22 and clear the counter value, and then the counter unit CNT1 receives the forced turn OFF signal off_trg_p from the peak power limiting circuit 26 and begins counting again. The counter value counted by the counter unit CNT1 is compared by the digital comparator COMP4 to a target switching number Nsw_t that is set by the switching cycle target number setting unit SET1. The target switching number Nsw_t is equivalent to twice the switching number Nsw_ovp described earlier. When the counter value of the counter unit CNT1 reaches the target switching number Nsw_t, the digital comparator COMP4 outputs the switching stop signal sw_stop.

As shown in FIG. 8, in the current resonant switching power supply device of the configuration described above, the ON trigger signal on_trg and OFF trigger signal off_trg are output from the oscillation circuit 22. The ON trigger signal on_trg and OFF trigger signal off_trg are transmitted to the control circuit 23. In the control circuit 23, the high-side drive signal hi_pre and low-side drive signal lo_pre are generated on the basis of the ON trigger signal on_trg and OFF trigger signal off_trg and supplied to the high-side drive circuit 24 and low-side drive circuit 25. The high-side drive circuit 24 outputs a signal VHO from the HO terminal, and the low-side drive circuit 25 outputs a signal VLO from the LO terminal. When the switching devices Q1 and Q2 are turned ON/OFF by the signals VHO and VLO, a current ILr flows to the primary coil P1 of the transformer T1.

As shown in FIG. 8, when the voltage Vcr across both terminals of the resonant capacitor C6 exceeds the threshold voltage Vref_h or falls below the threshold voltage Vref_l, the peak power limiting circuit 26 outputs the forced turn OFF signal off_trg_p. The forced turn OFF signal off_trg_p is converted to the OFF trigger signal off_trg by the oscillation circuit 22.

In a switching power supply device having the current resonant DC-DC converter according to Embodiment 1, it is possible to estimate changes in output voltage at the primary side without feedback from the secondary side, and thus it is unnecessary to have a dedicated circuit for detecting output voltage at the secondary side. Due to this, it is possible to lower the costs of the switching power supply device and simplify the configuration thereof.

Embodiment 2

Figure 9:
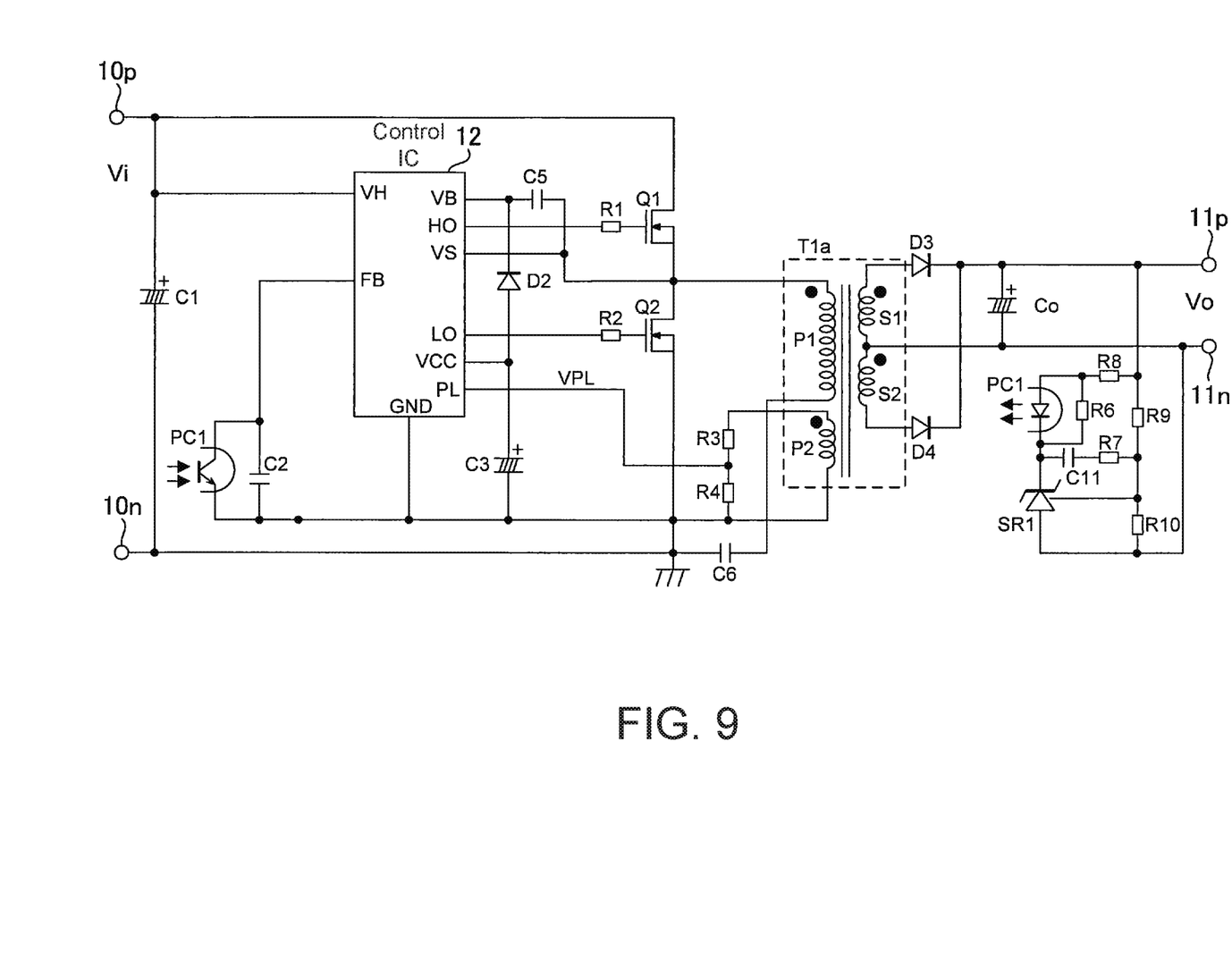
FIG. 9 is a circuit diagram showing a configuration example of a switching power supply device provided with a current resonant DC-DC converter according to Embodiment 2.
Figure 10:
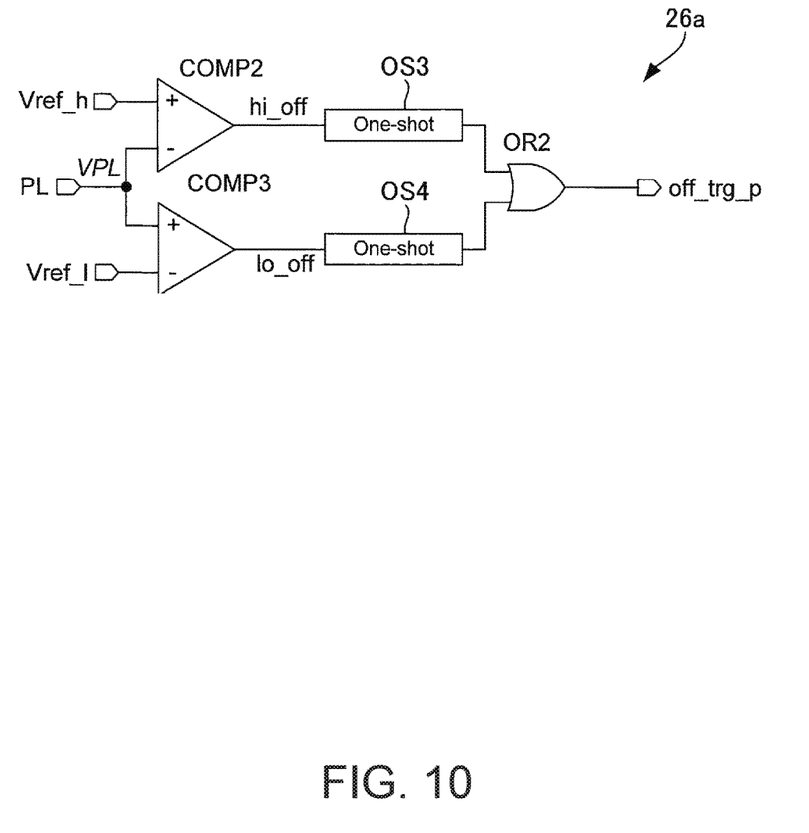
FIG. 10 is a circuit diagram showing a configuration example of a peak power limiting circuit.
Figure 11:
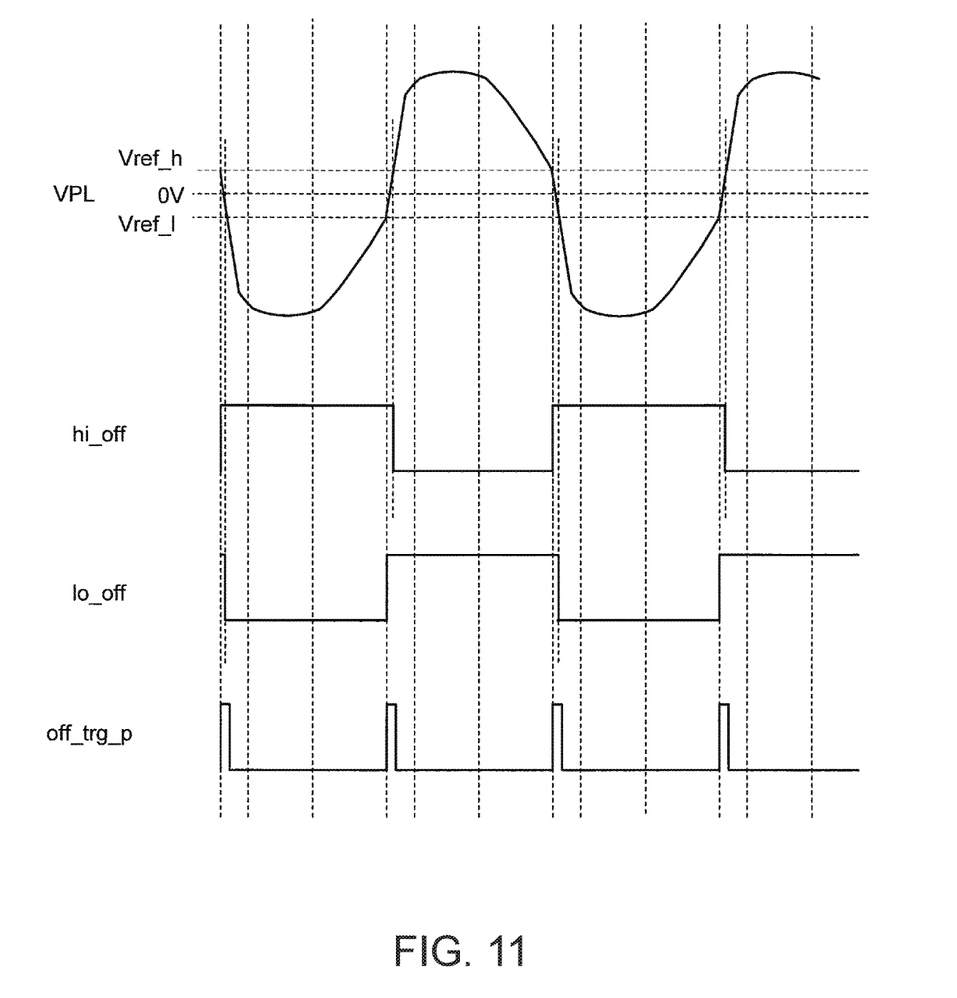
FIG. 11 is a drawing showing an operation sequence of the peak power limiting circuit during peak power limiting.

FIG. 9 is a circuit diagram showing a configuration example of a switching power supply device provided with a current resonant DC-DC converter according to Embodiment 2, FIG. 10 is a circuit diagram showing a configuration example of a peak power limiting circuit, and FIG. 11 is a drawing showing an operation sequence of the peak power limiting circuit during peak power limiting. In FIG. 9, constituent elements that are the same or similar to those shown in FIG. 1 are given the same reference characters and detailed explanations thereof are omitted.

As shown in FIG. 9, in the switching power supply device provided with the current resonant DC-DC converter according to Embodiment 2, a transformer T1a has an auxiliary coil P2 on a primary side thereof. One terminal of the auxiliary coil P2 is connected to one terminal of a resistor R3, and the other terminal of the auxiliary coil P2 is connected to ground. The other terminal of the resistor R3 is connected to one terminal of a resistor R4, and the other terminal of the resistor R4 is connected to ground. The node shared by the resistors R3 and R4 is connected to the PL terminal of the control IC 12, and a voltage VPL, which is a voltage induced in the auxiliary coil P2 and then divided, is supplied to the PL terminal of the control IC 12. The other constituent elements are the same as those shown in FIG. 1. Furthermore, the configuration of the control IC 12 is also the same as that shown in FIG. 2. The auxiliary coil P2 is used to obtain the power supply voltage for the control IC 12 during switching operation, which is the same as in the switching power supply device provided with the current resonant DC-DC converter of Embodiment 1. Accordingly, the auxiliary coil P2 of Embodiment 2 is not a new addition to the configuration and thus does not lead to a substantial increase in cost.

However, as shown in FIG. 10, a peak power limiting circuit 26a has the same constituent elements as the peak power limiting circuit 26 shown in FIG. 5, but some of the connections have been changed. In particular, the comparator COMP2 receives the voltage VPL at the inverting input terminal thereof, and receives a threshold voltage Vref_h at the non-inverting input terminal. Furthermore, the comparator COMP3 receives the threshold voltage Vref_l at the inverting input terminal thereof, and receives the voltage VPL at the non-inverting input terminal. The one-shot circuits OS3, OS4 and the OR circuit OR2 have the same configurations as those shown in FIG. 5. The threshold voltages Vref_h and Vref_l are determined by equations (7) and (8) shown below. N in equation (7) is a turn ratio of the primary coil P1 and the auxiliary coil P2 of the transformer T1a.

[Eq. 2]

$$\mathrm{Vref\_h} = \left(\frac{Vi}{2} - \frac{\Delta Vcr}{2}\right) * \frac{R4}{R3+R4} * \frac{1}{N} \quad (7)$$

$$\mathrm{Vref\_l} = -\mathrm{Vref\_h} \quad (8)$$

In the peak power limiting circuit 26a, the voltage VPL input to the PL terminal changes based on a reference voltage of 0V, as shown in FIG. 11. When the voltage VPL drops and falls below the threshold voltage Vref_h, the comparator COMP2 outputs an H level signal hi_off. This causes the one-shot circuit OS3 to output a signal having a prescribed ON width that rises in synchronization with the rising edges of the signal hi_off and is output from the OR circuit OR2 as the forced turn OFF signal off_trg_p. Conversely, when the voltage VPL rises and becomes higher than the threshold voltage Vref_h, the comparator COMP2 outputs an L level signal hi_off. At such time, the one-shot circuit OS3 does nothing, and outputs the L level signal.

Furthermore, when the voltage VPL drops and falls below the threshold voltage Vref_l, the comparator COMP3 outputs an L level signal lo_off. At such time, the one-shot circuit OS4 does nothing, and outputs the L level signal. Conversely, when the voltage VPL rises and becomes higher than the threshold voltage Vref_l, the comparator COMP3 outputs an H level signal lo_off. This causes the one-shot circuit OS4 to output a signal having a prescribed ON width that rises in synchronization with the rising edges of the signal lo_off and is output from the OR circuit OR2 as the forced turn OFF signal off_trg_p.

In the current resonant DC-DC converter of Embodiment 2, the voltage of the primary coil P1 decreases as the voltage across both terminals of the resonant capacitor C6 increases, and the voltage of the auxiliary coil P2 is proportional to the voltage of the primary coil P1. Accordingly, the voltage VPL is a signal that decreases as the input current transmitted to the resonant capacitor C6, or in other words, the energy input to the current resonant DC-DC converter, in one round of switching increases.

In the peak power limiting circuit 26a, during normal operation, the timing at which the comparator COMP1 shown in FIG. 3 outputs the OFF trigger signal off_trg is when the voltage VPL is higher than the threshold voltage Vref_h in FIG. 8 or lower than the threshold voltage Vref_l. In an abnormal state this is reversed, and thus the timing at which the comparator COMP1 shown in FIG. 3 outputs the OFF trigger signal off_trg is when the voltage VPL becomes lower than the threshold voltage Vref_h in FIG. 8 or higher than the threshold voltage Vref_l; therefore, an excess amount of energy is input.

In Embodiment 2, when an abnormal state occurs in which the output voltage can no longer be controlled as normal, the peak power limiting circuit 26a outputs the forced turn OFF signal off_trg_p each time the voltage VPL enters within the voltage range of the threshold voltage Vref_h and threshold voltage Vref_l, thereby limiting the amount of energy that is input.

The forced turn OFF signal off_trg_p output by the peak power limiting circuit 26a is counted in the switching cycle counter circuit 27. The operation for stopping the switching operation when the number of forced turn OFF signals off_trg_p has reached the target switching number Nsw_t is the same as in Embodiment 1.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A switching power supply device, comprising:
   a transformer having a primary side and a secondary side;
   a first series circuit to which a direct-current input voltage is applied to respective terminals thereof, the first series circuit connecting a first switching device on a high side and a second switching device on a low side in series, a node between the first and second switching devices being connected to the primary side of the transformer;
   a second series circuit connecting a resonant inductor and a resonant capacitor in series, the second series circuit being connected in parallel to the first switching device or the second switching device; and
   a control unit alternately turning the first switching device and the second switching device ON/OFF so as to drive the primary side of the transformer,
   wherein the control unit includes:
      a peak power limiting circuit that monitors input power to the primary side of the transformer that varies in each driving cycle in synchronization with the alternate turning ON/OFF of the first and second switching devices and outputs a forced turn OFF signal every time the input power becomes higher than a prescribed value at a timing at which the input power exceeds the prescribed value, the forced turn OFF signal forcedly turning OFF the first switching device or the second switching device alternately each time the forced turn OFF signal is outputted during each driving cycle; and
      a switching cycle counter circuit that estimates an output voltage on the secondary side of the transformer by counting a number of times the forced turn OFF signal is outputted by the peak power limiting circuit, and outputs a switching stop signal that causes the alternating turning ON/OFF of the first and second switching devices to stop when the estimated output voltage reaches an overvoltage protection detection voltage.

2. The switching power supply device according to claim 1, wherein the control unit receives, as a signal representing the input power, a voltage that is a divided voltage of a voltage across respective terminals of the resonant capacitor.

3. The switching power supply device according to claim 2, wherein the peak power limiting circuit includes: a first comparator that compares the signal representing the input power with a first threshold; a first one-shot circuit that is connected to an output of the first comparator and outputs a pulse at a timing at which the signal representing the input power exceeds the first threshold; a second comparator that compares the signal representing the input power with a second threshold lower than the first threshold; a second one-shot circuit that is connected to an output of the second comparator and outputs a pulse at a timing at which the signal representing the input power falls below the second threshold; and an OR circuit that receives the outputs of the first-one shot circuit and the second one-shot circuit and outputs the forced turn OFF signals.

4. The switching power supply device according to claim 1, wherein the control unit receives, as a signal representing the input power, a voltage that is a divided voltage of a voltage across respective terminals of an auxiliary coil provided on the primary coil side of the transformer that forms the resonant inductor.

5. The switching power supply device according to claim 4, wherein the peak power limiting circuit includes: a first comparator that compares the signal representing the input power with a first threshold; a first one-shot circuit that is connected to an output of the first comparator and outputs a pulse at a timing at which the signal representing the input power falls below the first threshold; a second comparator that compares the signal representing the input power with a second threshold lower than the first threshold; a second one-shot circuit that is connected to an output of the second comparator and outputs a pulse at a timing at which the signal representing the input power exceeds the second threshold; and an OR circuit that receives the outputs of the first-one shot circuit and the second one-shot circuit and outputs the forced turn OFF signals.

6. The switching power supply device according to claim 1, wherein the switching cycle counter circuit includes: a counter unit that counts the number of times the forced turn OFF signal is outputted by the peak power limiting circuit; a switching cycle target number setting unit that sets a target number of switching cycles at which the output voltage reaches the overvoltage protection detection voltage; and a digital comparator that compares an output of the counter unit with the target number set by the switching cycle target number setting unit, and outputs the switching stop signal when the output of the counter unit has reached the target number.

7. The switching power supply device according to claim 1,
   wherein the control unit further includes an oscillation circuit that determines a first timing at which an ON trigger signal is generated and outputs the ON trigger signal at said first timing; determines a second timing at which an OFF trigger signal is generated in accordance with a feedback signal from the secondary side of the transformer; and outputs, at said second timing, the OFF trigger signal and a reset signal that resets a counter value of the switching cycle counter circuit, and
   wherein every time the forced turn OFF signal is outputted from the peak power limiting circuit, the oscillation circuit outputs the OFF trigger signal at a timing at which the forced turn OFF signal is outputted irrespective of the second timing.

8. A switching power supply device, comprising:
   a transformer having a primary side and a secondary side;
   a first series circuit to which a direct-current input voltage is applied to respective terminals thereof, the first series circuit connecting a first switching device on a high side and a second switching device on a low side in series, a node between the first and second switching devices being connected to the primary side of the transformer;
   a second series circuit connecting a resonant inductor and a resonant capacitor in series, the second series circuit being connected in parallel to the first switching device or the second switching device; and
a control unit alternately turning the first switching device and the second switching device ON/OFF so as to drive the primary side of the transformer,
wherein the control unit includes:
a peak power limiting circuit that monitors input power to the primary side of the transformer and outputs a forced turn OFF signal every time the input power becomes higher than a prescribed value; and
a switching cycle counter circuit that estimates an output voltage on the secondary side of the transformer by counting a number of times the forced turn OFF signal is outputted by the peak power limiting circuit, and outputs a switching stop signal that causes the alternating turning ON/OFF of the first and second switching devices to stop when the estimated output voltage reaches an overvoltage protection detection voltage, and
wherein the switching cycle counter circuit includes: a counter unit that counts the number of times the forced turn OFF signal is outputted by the peak power limiting circuit; a switching cycle target number setting unit that sets a target number of switching cycles at which the output voltage reaches the overvoltage protection detection voltage; and a digital comparator that compares an output of the counter unit with the target number set by the switching cycle target number setting unit, and outputs the switching stop signal when the output of the counter unit has reached the target number.

9. The switching power supply device according to claim 8, wherein the control unit receives, as a signal representing the input power, a voltage that is a divided voltage of a voltage across respective terminals of the resonant capacitor.

10. The switching power supply device according to claim 9, wherein the peak power limiting circuit includes: a first comparator that compares the signal representing the input power with a first threshold; a first one-shot circuit that is connected to an output of the first comparator and outputs a pulse at a timing at which the signal representing the input power exceeds the first threshold; a second comparator that compares the signal representing the input power with a second threshold lower than the first threshold; a second one-shot circuit that is connected to an output of the second comparator and outputs a pulse at a timing at which the signal representing the input power falls below the second threshold; and an OR circuit that receives the outputs of the first-one shot circuit and the second one-shot circuit and outputs the forced turn OFF signals.

11. The switching power supply device according to claim 8, wherein the control unit receives, as a signal representing the input power, a voltage that is a divided voltage of a voltage across respective terminals of an auxiliary coil provided on the primary coil side of the transformer that forms the resonant inductor.

12. The switching power supply device according to claim 11, wherein the peak power limiting circuit includes: a first comparator that compares the signal representing the input power with a first threshold; a first one-shot circuit that is connected to an output of the first comparator and outputs a pulse at a timing at which the signal representing the input power falls below the first threshold; a second comparator that compares the signal representing the input power with a second threshold lower than the first threshold; a second one-shot circuit that is connected to an output of the second comparator and outputs a pulse at a timing at which the signal representing the input power exceeds the second threshold; and an OR circuit that receives the outputs of the first-one shot circuit and the second one-shot circuit and outputs the forced turn OFF signals.

13. The switching power supply device according to claim 8,
wherein the control unit further includes an oscillation circuit that determines a first timing at which an ON trigger signal is generated and outputs the ON trigger signal at said first timing; determines a second timing at which an OFF trigger signal is generated in accordance with a feedback signal from the secondary side of the transformer; and outputs, at said second timing, the OFF trigger signal and a reset signal that resets a counter value of the switching cycle counter circuit, and
wherein every time the forced turn OFF signal is outputted from the peak power limiting circuit, the oscillation circuit outputs the OFF trigger signal at a timing at which the forced turn OFF signal is outputted irrespective of the second timing.

14. A switching power supply device, comprising:
a transformer having a primary side and a secondary side;
a first series circuit to which a direct-current input voltage is applied to respective terminals thereof, the first series circuit connecting a first switching device on a high side and a second switching device on a low side in series, a node between the first and second switching devices being connected to the primary side of the transformer;
a second series circuit connecting a resonant inductor and a resonant capacitor in series, the second series circuit being connected in parallel to the first switching device or the second switching device; and
a control unit alternately turning the first switching device and the second switching device ON/OFF so as to drive the primary side of the transformer,
wherein the control unit includes:
a peak power limiting circuit that monitors input power to the primary side of the transformer and outputs a forced turn OFF signal every time the input power becomes higher than a prescribed value; and
a switching cycle counter circuit that estimates an output voltage on the secondary side of the transformer by counting a number of times the forced turn OFF signal is outputted by the peak power limiting circuit, and outputs a switching stop signal that causes the alternating turning ON/OFF of the first and second switching devices to stop when the estimated output voltage reaches an overvoltage protection detection voltage,
wherein the control unit further includes an oscillation circuit that determines a first timing at which an ON trigger signal is generated and outputs the ON trigger signal at said first timing; determines a second timing at which an OFF trigger signal is generated in accordance with a feedback signal from the secondary side of the transformer; and outputs, at said second timing, the OFF trigger signal and a reset signal that resets a counter value of the switching cycle counter circuit, and
wherein every time the forced turn OFF signal is outputted from the peak power limiting circuit, the oscillation circuit outputs the OFF trigger signal at a timing at which the forced turn OFF signal is outputted irrespective of the second timing.

15. The switching power supply device according to claim 14, wherein the control unit receives, as a signal representing the input power, a voltage that is a divided voltage of a voltage across respective terminals of the resonant capacitor.

16. The switching power supply device according to claim 15, wherein the peak power limiting circuit includes: a first comparator that compares the signal representing the input power with a first threshold; a first one-shot circuit that is connected to an output of the first comparator and outputs a pulse at a timing at which the signal representing the input power exceeds the first threshold; a second comparator that compares the signal representing the input power with a second threshold lower than the first threshold; a second one-shot circuit that is connected to an output of the second comparator and outputs a pulse at a timing at which the signal representing the input power falls below the second threshold; and an OR circuit that receives the outputs of the first-one shot circuit and the second one-shot circuit and outputs the forced turn OFF signals.

17. The switching power supply device according to claim 14, wherein the control unit receives, as a signal representing the input power, a voltage that is a divided voltage of a voltage across respective terminals of an auxiliary coil provided on the primary coil side of the transformer that forms the resonant inductor.

18. The switching power supply device according to claim 17, wherein the peak power limiting circuit includes: a first comparator that compares the signal representing the input power with a first threshold; a first one-shot circuit that is connected to an output of the first comparator and outputs a pulse at a timing at which the signal representing the input power falls below the first threshold; a second comparator that compares the signal representing the input power with a second threshold lower than the first threshold; a second one-shot circuit that is connected to an output of the second comparator and outputs a pulse at a timing at which the signal representing the input power exceeds the second threshold; and an OR circuit that receives the outputs of the first-one shot circuit and the second one-shot circuit and outputs the forced turn OFF signals.

* * * * *